Patented Apr. 30, 1929.

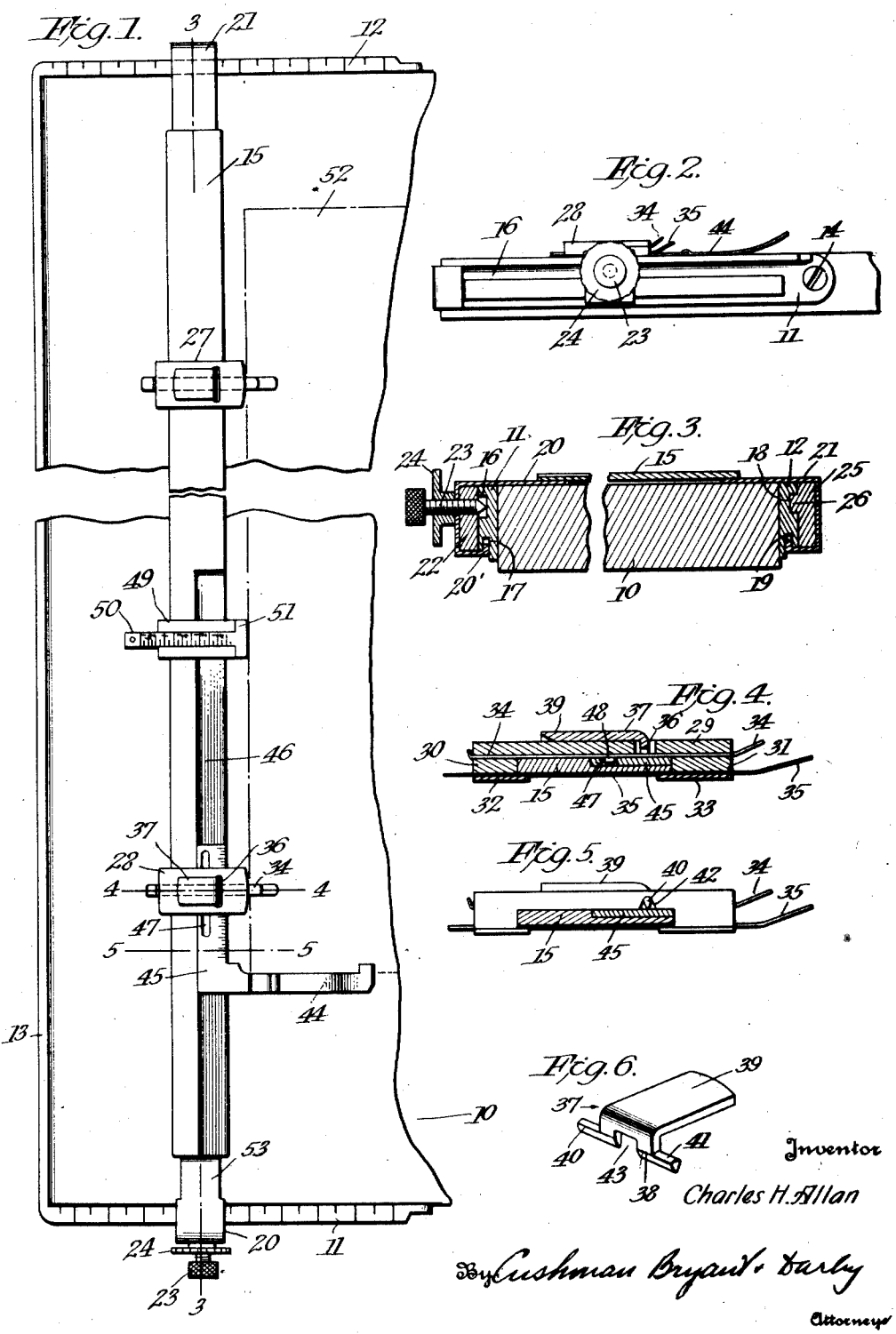

1,710,853

UNITED STATES PATENT OFFICE.

CHARLES H. ALLAN, OF RYEGATE, MONTANA.

GAUGE PIN AND BAR ASSEMBLY.

Application filed May 1, 1928. Serial No. 274,278.

The present invention relates to a gauge pin and bar assembly in combination with a job press platen, and has for its purpose the provision of extremely simple and accurate means for securing proper register on the tympan. Such an assembly is not new in its broadest aspect and, consequently, the present invention has particular reference to certain improvements in detail.

The invention will be described with reference to the accompanying drawings, wherein:

Figure 1 shows in top plan view a portion of a job press platen with the devices of the present invention mounted thereon.

Figure 2 is a side elevation of a portion of the platen as seen from the bottom of Figure 1.

Figure 3 is an interrupted section of the platen on the line 3—3 of Figure 1.

Figure 4 is a section on the line 4—4 of Figure 1.

Figure 5 is a section on the line 5—5 of Figure 1, and

Figure 6 is a perspective of a detail.

Referring now to the drawing, 10 represents an end portion of a platen to which is pivoted a bail composed of side members 11 and 12 and a connecting member 13. The members 11 and 12 pivot about screws as 14, Figure 2. This bail serves to secure one end of the tympan sheet to the platen in the ordinary manner, but in addition to this function members 11 and 12 are formed so as to constitute guideways for the transverse bar 15. As may be seen from Figures 2 and 3 in particular, side member 11 is provided with a longitudinal lateral groove 16 and a downwardly open groove 17, and member 12 has similar grooves 18 and 19. Bar 15 is composed of an elongated strap-like intermediate portion and end portions 20 and 21, which are adapted to engage at their extreme ends with the downwardly open grooves of members 11 and 12. As is most clearly shown in Figure 3, the ends of bar 15 rests on top of the ends of members 20 and 21, so that the intermediate portion of the bar is spaced above the tympan a distance equal to the thickness of the said end elements. Element 20 extends somewhat beyond member 20, and then is bent downwardly, inwardly and upwardly, so that its extreme end 20' engages in groove 17, so as to slide therein. The looped end has secured therein a stiffening block 22 having a flat face slidable along the lateral face of member 11. The block and the vertical section of element 20, are provided with a threaded bore in register with groove 16, and in this bore is threaded a headed screw 23 with a lock-nut 24. The end of element 21 is looped in the same manner as described in connection with element 20, its extreme upturned end engaging in groove 19 of member 12. A similar stiffening block 25 is provided, although in this instance the block has a rib 26 engaging in groove 18. The top surfaces of side members 11 and 12 are provided with suitable graduations, and it is obvious that by loosening screw 23, the bar may be slid longitudinally of the guide elements and trued up by reference to the graduations. It can be securely locked in any adjusted position by suitable manipulation of screw 23 and lock-nut 24. Since the end sections of the bar are of strap material, it is essential that seating means in the nature of elements 20' and 17 be provided, since otherwise the straps would yield at the bends upon tightening screw 23.

Slidably mounted on bar 15 are a pair of lower gauge pins 27 and 28, the latter being shown in cross section in Figure 4. Referring to this figure, it will be seen that the pin is composed of an upper plate 29, end blocks 30 and 31 of the same thickness as bar 15, and lower plates 32 and 33 whose inner edges engage underneath the lower margins of the bar. The lower face of plate 29 is provided with a groove transversely of bar 15 through which extends an upper spring guide tongue 34. The upper faces of plates 32 and 33 are provided with aligned grooves immediately below guide tongue 34, through which extends a lower spring guide tongue 35. Tongue 34 is immediately above bar 15, and tongue 35 immediately below, so that sliding movement of the guage pin is unimpeded. Upper plate 29 is provided with a slot 36 extending in the longitudinal direction of bar 15, and through this slot projects the end of a locking clip 37. Clip 37 consists of a cam portion 38, and an angularly disposed lever portion 39. The ends of the cam portion are extended to form bearings 40 and 41, which work in grooves as 42 in the lower face of plate 29 at the extremities of slot 36. The cam portion 38 is bifurcated or interrupted as at 43, Figure 6, so that the two portions of the cam straddle tongue 34. The arrangement of parts is such that when lever portion 39 of clip 37 is swung upwardly, cam 38 is released from pressure contact with bar 15, whereas when lever 39 is brought into horizontal position against the top of plate 29, the cam is brought into position to securely clamp the gauge pin to the bar. As shown, gauge pins 27 and 28 are of identical structure.

The spring end pin 44 is mounted on a slide 45 which is slidable in a rabbeted guideway 46 of bar 15, the relation of these parts being clearly shown in Figure 5. It will be seen from this figure that guide pin 28 rests on both the bar and the slide, so that it may be moved relative to either, portion 45 may be moved relative to the bar and gauge pin 28, or gauge pin 28 and end pin 44 may be moved in constant relation relative to the bar. In order that gauge pin 28 may not leave portion 45, the latter is provided with a slot 47 and the former with a lug 48 engaging in the slot. The abutment of lug 48 against the ends of the slot 47, limits the relative movement of the two elements.

Preferably intermediate the gauge pins 27 and 28, is disposed a device which I shall term a margin finder. This device comprises a block 49 slidable along bar 15 in the same manner as gauge pins 27 and 28. Block 49 is provided with a dove-tailed groove at right angles to the longitudinal axis of bar 15, and in this groove is disposed a tongue 50 having a head 51 which projects inwardly of the platen, when the tongue is in its fully retracted position, to an extent exactly equal to the inward extent of gauge pins 27 and 28. The lower surface of head 51 rests directly on the tympan sheet and the tongue and guide block are provided with cooperating graduations so that when the head is in projected position, the distance between its rear face and the adjacent face of the guide block may be accurately measured.

When the device is to be set, an impression may be taken on the tympan sheet and, thereupon, the bar is advanced until the forward edge of head 21 coincides with the type. Thereupon, head 51 is retained in this position by pressing it against the tympan and bar 15 is moved rearwardly until the cooperating graduations of the guide block 49 and tongue 50 show that the desired margin has been established; whereupon the ends of the guide bar are trued up relative to the graduations on members 11 and 12, and the bar locked in adjusted position. Head 51 is now retracted and lower pins 27 and 28 and end pin 44 suitably adjusted to receive sheet 52 in proper register. It will be noted that each of the gauge pins 27 and 28 is provided with an upper and lower guide tongue. When using stock of ordinary thickness, the lower tongue will be used, but when stock of extreme thickness is to be printed, the lower tongue will be withdrawn and the upper tongue used. Also, at one end of bar 15 is a constricted area 52, and upon removing the lower tongues from the gauge pins and sliding the latter down to this position, their lower flanges will be released from engagement so that the pins may be dismounted from the bar.

From the above description, it will be seen that I have provided an extremely simple device, which may be very rapidly and accurately manipulated, and which may be used in connection with most types of work. While I have described my invention with reference to particular embodiments of the various features, it is to be understood that my present disclosure is intended to be rather suggestive than restricted, since many modifications as to detail will occur to those skilled in the art.

I claim:

1. The combination with a printing press platen, of a gauge pin bar extending over the top thereof, said bar being laterally adjustable over the platen, a gauge pin mounted on said bar, and a margin finding device on said bar, said device comprising a guide block and a tongue guided by said block for sliding movements transversely of said bar, said block and tongue having cooperating graduations, whereby the tongue being held stationary, said block and bar may be adjusted longitudinally thereof by measured distances to bring said gauge pin into desired working position, and means for securing said bar in adjusted position on the platen.

2. The combination with a printing press platen, of a gauge pin bar extending over the top thereof, said bar being laterally adjustable over the platen, a gauge pin mounted on said bar, and a margin finding device on said bar, said device comprising a guide block slidable along said bar and a tongue guided by said block for sliding movements transversely of said bar, said block and tongue having cooperating graduations, whereby the tongue being held stationary, said block and bar may be adjusted longitudinally thereof by measured distances to bring said gauge pin into desired working position, and means for securing said bar in adjusted position on the platen.

3. The combination with a printing press platen, of a gauge bar extending over the top thereof, said bar being laterally adjustable over the platen, a gauge pin mounted on said bar with its head portion projecting laterally of said bar, and a margin finding device on said bar, said device comprising a guide block and a tongue guided by said block for projective and retractive sliding movements transversely of said bar, said tongue having a head portion projecting laterally of said bar in its retracted limit position a distance equal to the projection of the head portion of said gauge pin and on the same side of said bar, said block and tongue having cooperating graduations, whereby the tongue being held stationary, said block and bar may be adjusted longitudinally thereof by measured distances to bring said gauge pin into desired working position, and means for securing said bar in adjusted position on the platen.

4. The combination with a printing press platen, of a gauge bar extending over the top thereof, said bar being laterally adjustable over the platen, a gauge pin mounted on said bar with its head portion projecting laterally of said bar, and a margin finding device on said bar, said device comprising a guide block slidable along said bar and a tongue guided by said block for projective and retractive sliding movements transversely of said bar, said tongue having a head portion projecting laterally of said bar in its retracted limit position a distance equal to the projection of the head portion of said gauge pin and on the same side of said bar, said block and tongue having cooperating graduations, whereby the tongue being held stationary, said block and bar may be adjusted longitudinally thereof by measured distances to bring said gauge pin into desired working position, and means for securing said bar in adjusted position on the platen.

5. The combination with a printing press platen, of a gauge pin bar of strap-like form extending from end to end over the top thereof, and guide strips on the ends of the platen, said guide strips being provided with downwardly open grooves along their lower portions, and portions at the ends of said bars projecting upwardly into said grooves.

6. The combination with a printing press platen, of a gauge pin bar extending over the top thereof, a gauge pin slidably mounted on said bar, cam means journaled in said pin above the bar for clamping the pin to the bar, and a lever for operating said cam means, said lever lying closely along the top of the pin when the cam is in clamping position.

7. The combination with a printing press platen, of a gauge pin bar extending over the top thereof, a gauge pin in sliding engagement with said bar, a tongue slidable in said pin above said bar, and cam means journaled in said pin above said bar and adapted to clampingly engage the latter, said cam means being bifurcated to straddle said tongue.

8. The combination with a printing press platen, of a gauge pin bar extending over the top thereof, a gauge pin in sliding engagement with said bar, a tongue slidable in said pin above said bar, and a tongue slidable in said pin below said bar.

9. The combination with a printing press platen, of a gauge pin bar extending over the top thereof, a lower gauge pin slidable on said bar, an end pin slidable on said bar, and common means for clamping the two pins to said bar.

10. The combination with a printing press platen, of a gauge pin bar extending over the top thereof, a lower gauge pin slidable on said bar, an end pin slidable on said bar, and means to lock said lower gauge pin to the end pin and to the bar.

11. The combination with a printing press platen, of a gauge pin bar extending over the top thereof, a lower gauge pin slidable on said bar, an end pin slidable on said bar, and means connecting the pins whereby when one of the pins is moved along the bar the other pin is carried therewith.

12. The combination with a printing press platen, of a gauge pin bar extending over the top thereof, a lower gauge pin slidable on said bar, an end pin slidable on said bar, and a lost motion connection between the pins whereby when one of them is moved along the bar the other is carried therewith.

13. The combination with a printing press platen, of a gauge pin bar extending over the top thereof, a lower gauge pin slidable on said bar, an end pin slidable on said bar, a lost motion connection between the pins whereby when one of them is moved along the bar the other is carried therewith, and means to lock the two pins to said bar in variably spaced relation to each other.

14. The combination with a printing press platen, of a gauge pin bar extending over the top thereof, a lower gauge pin slidable on said bar, an end pin slidable on said bar, a lost motion connection between the pins whereby when one of them is moved along the bar the other is carried therewith, and common means to lock the two pins to said bar in variably spaced relation to each other.

15. The combination with a printing press platen, of a gauge pin bar extending over the top thereof, an end gauge pin having a portion extending a distance along said bar and slidable longitudinally thereof, a lower gauge pin mounted to slide along said bar and along said portion of said end gauge pin a limited distance, and means to lock the lower pin and said portion of the end gauge pin to the bar.

16. The combination with a printing press platen, of a gauge pin bar extending over the top thereof, an end gauge pin having a portion extending a distance along the said bar and slidable longitudinally thereof, said bar being rabbeted to form a guide for said portion, a lower gauge pin mounted to slide along said bar and along said portion of said end gauge pin a limited distance, and means to lock the lower pin and said portion of the end gauge pin to the bar.

17. The combination with a printing press platen, of a gauge pin extending over the top thereof, an end gauge pin having a portion extending a distance along said bar and slidable longitudinally thereof, a lower gauge pin mounted to slide along said bar and along said portion of said end gauge pin, a pin and slot connection between said lower gauge pin and said portion to limit relative movement of the two, and means to clamp together in contact relation the lower gauge pin, said portion of the end gauge pin and said bar.

18. The combination with a printing press platen, of a gauge pin bar extending over the top thereof, and a gauge pin mounted to slide along the top of said bar and having flanges engaging the bottom lateral margins of said bar, said bar having a restricted portion adapted to free said flanges to permit removal of said gauge pin.

In testimony whereof I have hereunto set my hand.

CHARLES H. ALLAN.